United States Patent

[11] 3,622,122

| [72] | Inventor | George E. Hansen |
| | | Elmwood Park, Ill. |
| [21] | Appl. No. | 6,814 |
| [22] | Filed | Jan. 29, 1970 |
| [45] | Patented | Nov. 23, 1971 |
| [73] | Assignee | Crane Co. |
| | | Chicago, Ill. |

[54] FABRICATED VALVE BODY
7 Claims, 7 Drawing Figs.

[52] U.S. Cl. .................................................. 251/367
[51] Int. Cl. ..................................................... F16k 27/00
[50] Field of Search ........................................... 251/356,
367, 366, 305, 315; 29/445

[56] References Cited
UNITED STATES PATENTS

| 1,288,811 | 12/1918 | Birrell | 251/356 |
| 1,768,830 | 7/1930 | Dansereau et al. | 251/356 |
| 2,947,320 | 8/1960 | Oxley et al. | 251/367 X |
| 3,048,363 | 8/1962 | Garrigan | 251/367 X |
| 3,091,428 | 5/1963 | Magos | 251/367 X |
| 3,225,779 | 12/1965 | Lootzook | 251/367 X |
| 3,295,552 | 1/1967 | Powell et al. | 251/367 X |
| 3,468,331 | 9/1969 | O'Neal | 251/367 X |

Primary Examiner—Samuel Scott
Attorney—George S. Schwind

ABSTRACT: A fabricated hollow body for containing fluids, for use as a valve body or the like, and a method for making the same. The body is fabricated by stacking a plurality of preformed metal stampings to the desired body thickness, securing said stampings, drilling trunnion holes in the body, mounting suitable trunnions therein, and, placing the desired stem mounted closure member in said trunnion.

PATENTED NOV 23 1971 3,622,122
SHEET 1 OF 2
FIG. 1
FIG. 2
FIG. 3
FIG. 4
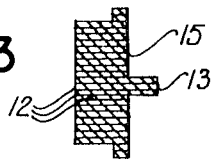
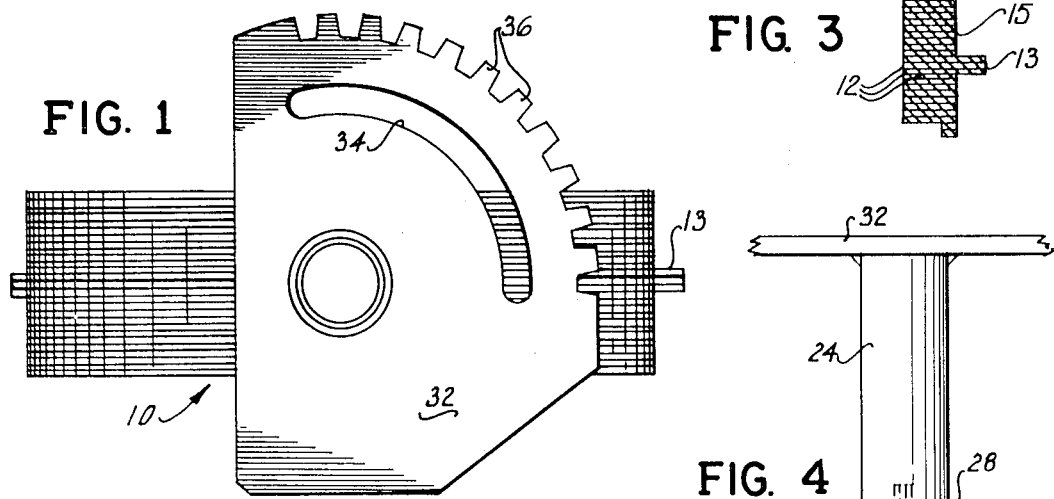
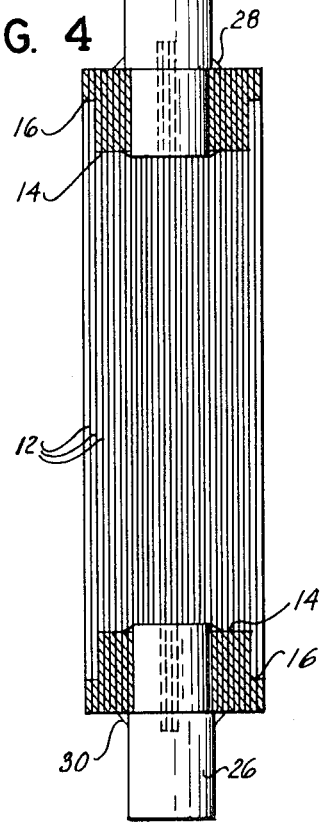
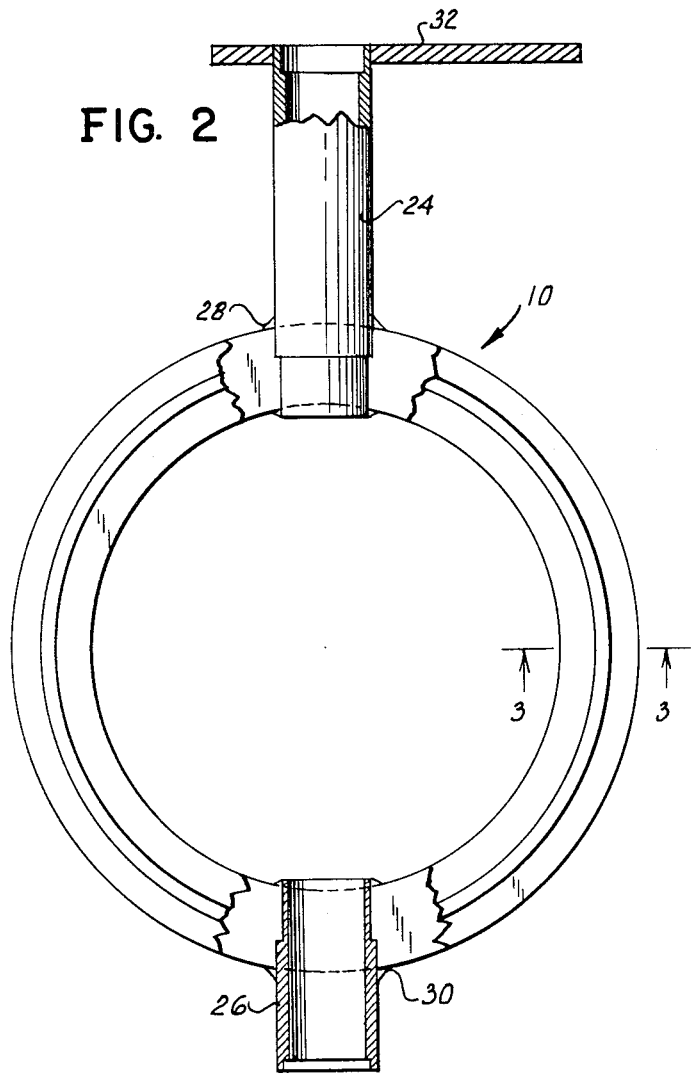

FABRICATED VALVE BODY

GENERAL BACKGROUND AND DESCRIPTION

In view of the increased costs associated with the well-known art of valve bodies which are cast of iron, steel or other alloys, it will be appreciated by those skilled in the art that a need exists for valve bodies which can be economically fabricated and still meet the requirements of size, strength, corrosion-resistance and various code specifications.

Such need for fabricated bodies and articles is not only prevalent in the valve industry but in numerous other industries and applications. The need in the valve industry is magnified by the fact that the casting of valve bodies is extremely expensive because of the cost of foundry molds, patterns, etc., in addition to the long term storage of such items for future use for the purpose of making replacement parts. Thus, the present invention substantially reduces the machining time associated with a cast body as only a single machining operation is necessitated.

It is the primary object of the present invention to provide a fabricated body, for use as a valve body or other similar vessel, wherein such foundry problems, cost, machining and equipment storage are substantially reduced. The method provides a fabrication means such that metal stampings are aligned in assembly, secured and subsequently drilled for the insertion of trunnions. The drilling operation being the only machining operation necessitated in this novel arrangement.

As a result of this invention, structures for containing fluids can be readily assembled by unskilled workers, and, stampings of standard size may be coated with any desired alloy to adapt such fabricated structure for the particular service the finished valve will be installed. The invention further provides a method of fabricating a valve body, as exemplary, wherein the seat of a valve may be either molded to the body, or affixed as a replaceable liner, in manners well known in the art. Such provisions found in the instant invention also permit structures of various sizes, strengths, wear and seat properties to be constructed at a substantial reduction of inventory costs.

Further objects and features of the present invention will be more fully understood from the following description of the preferred embodiment, taken in conjunction with the accompanying drawings in which:

FIG. 1 is a top view of the laminated body;

FIG. 2 is a partial cross-sectional side view of the laminated body;

FIG. 3 is a partial, cross-sectional view of the body along lines 3—3 of FIG. 2; and FIG. 4 is a partial cross-sectional view through the stem of the body.

Figure 5:
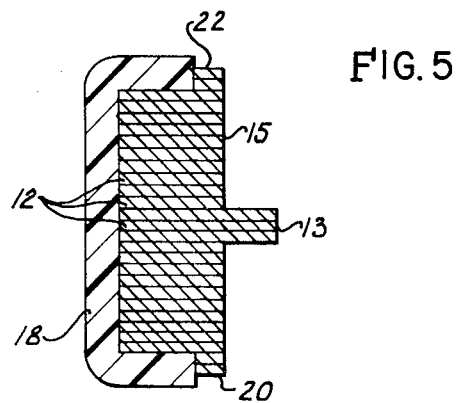
FIG. 5 is a partial cross-sectional view similar to FIG. 3 wherein a valve seat has been positioned in the recesses of the laminated body.

With reference to FIGS. 1–4, the body, generally indicated at 10, comprises a plurality of preformed laminated stampings 12 having aligned central orifices 14. The stampings 12 are ring shaped of fluid impervious sheet material and no restriction is placed on their thickness which conveniently can be of standard available sheet thickness. The stampings adjacent the end faces of the valve body, as shown in FIGS. 3 and 4, may have a larger internal diameter orifice 16 to form a recess in order to accommodate seat 18 made of conventional material such as fluorocarbon or elastomer. The seat 18, shown in FIG. 5 only, encircles the entire internal portion or circumference of the body in the well-known manner and may be either a replaceable liner or molded in place, in a manner well known in the art. FIGS. 1–4 show the body without the seat for purpose of clarity whereas FIG. 5, which is comparable to FIG. 3, shows a similar laminated body with the seat properly positioned. The seat 18 normally projects beyond the faces 20, 22 of the fabricated body 10 so as to form a seal between the mating pipe flanges; not shown, when the body is positioned in a pipeline, in the usual manner.

Trunnion means 24, 26 are positioned in diametrically opposed, aligned bores in the laminated body to support a valve stem and attached disk in any conventional manner. For purposes of clarity, the stem and disk are not shown as they are a well-known feature in the art. It is understood that the fabricated body herein described may be utilized not only for housing a disk-type closure but also a split swing check or other similar closure member. The trunnion means 24, 26 are affixed to the laminated body by welding or any other suitable means, as shown at 28, 30 in FIGS. 2 and 4, respectively. A conventional mounting plate 32 is affixed to the top trunnion 24 having a guide slot 34 and teeth 36, the latter cooperating with a pawl and ratchet means usually affixed to the valve handle, not shown, for locking the closure member in a desired position; such conventional elements forming no part of the instant invention. The handle is joined to the valve stem in the conventional manner whereby the position of the closure member relative to the valve body regulates the flow of fluid through said body.

With reference to FIG. 3, it will be observed that the laminations in the center portion of the fabricated body extend beyond the outer periphery of the adjacent laminations. This extended portion 13 encircles the entire body except where interrupted by trunnion means 24, 26.

The extended portion 13 may be used in a manner which enables flange bolts, which extend from one mating flange to another, to straddle the body 10 between such elements whereby the bolts contact the outer periphery of the extended portion, thereby centering the body when the same is installed in a pipeline. The extended portion 13 may also be provided with bolt holes equispaced around its periphery for the passage of flange bolts therethrough. Such securing means being well known in cast bodies.

Figure 6:
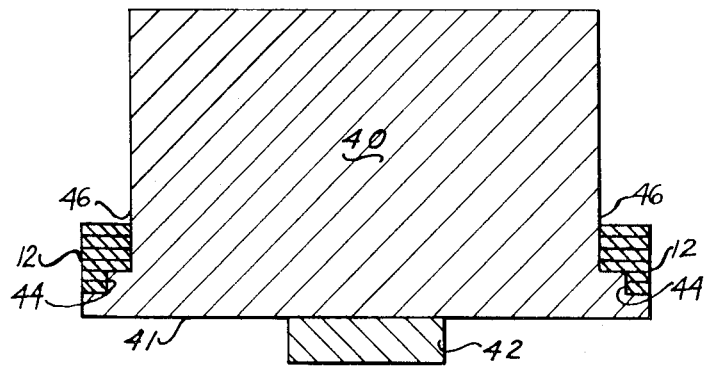
FIG. 6 is a vertical cross-sectional view of a mandrel which may be utilized in stacking and assembling the laminated body; and, FIG. 7 is a top view of the mandrel shown in FIG. 6.
Figure 7:
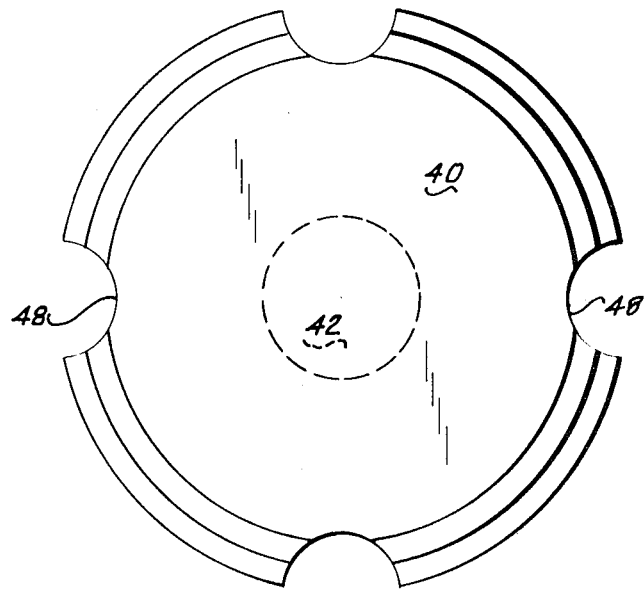

With reference to FIGS. 6 and 7, mandrel having base is adapted for positioning on a work table. The mandrel is designed to accommodate the laminations as they are stacked thereon. It is understood that the mandrel 40 may be so constructed to accept ring-shaped laminations which may be circular, elliptical, or other configuration and designed to receive a complementary closure member. The mandrel 40 is so shaped that it forms essentially a core for the finished body. Orifices 14 and 16 of laminated stampings have counterpart core portions 46 and 44, respectively, of mandrel 40.

With reference to FIG. 7, semicircular indentations 48 are positioned in the flange portion 41 of mandrel 40 so that the laminations 12 may be secured, by welding or the like, across their outer surface at equidistant points about their outer periphery.

To fabricate a laminated body, a series of laminations are placed on the mandrel 40. In the preferred embodiment, the first group of preformed laminated stampings, which have the larger diameter to accommodate a seat, as noted supra, are inserted on the mandrel. When these have been placed to the desired predetermined height, the second group, having the central orifices 14, corresponding to core portion 46, are then placed on the mandrel 40. These laminations are then secured together to prevent relative movement therebetween, as by welding on the external periphery. This half of the laminated body is then removed from the mandrel and another half is formed in an identical manner. Upon completing the fabrication of the second half of the fabricated body, the first completed half is returned to the mandrel and the two halves are secured together to form a unitary, symmetrical, laminated body by welding, brazing or other conventional means.

After the above fabrication has been completed by stacking the preformed laminated stampings 12 onto the mandrel, forming both halves thereof, and securing the halves, the fabricated body may be completed by drilling the trunnion holes in opposing diametrical alignment, inserting the respective trunnions 24 and 26, securing the same by welding or brazing and subsequently placing the desired seat into the fabricated body. As previously noted, the seat 18 may be molded in place or it may be a replaceable liner which is merely stretched over the internal portion of the completed body. To complete the valve structure, a disk having a stem affixed thereto is positioned in the respective trunnions in a manner well known in the art. Thus, the fabricated body as herein described is adapted to receive a stem and disk or closure member which is capable of regulating the flow of fluid through the seat body by orientating the closure member in the desired position relative to the body.

Although the instant invention has been described in reference to valve bodies, it is understood that the present disclosure is exemplary. Therefore numerous changes in details of construction, as well as the possible modes of utilization, will be apparent to those schooled in the art and may be resorted to without departing from the spirit and scope of the invention as claimed.

What is claimed is:

1. A structure for receiving fluid comprising a body member having a hollow central portion, said body member formed of a plurality of preformed, laminated stampings of fluid impervious material secured together in aligned relationship, said stampings being substantially flat so that alignment of successive layers provides said body member with parallel end faces, each of said end faces having a circumferential recess in proximity to said hollow portion of said body member, said recess adapted to receive a seat element which covers the central hollow portion of said body; and, diametrically opposing trunnion means positioned in said body and secured thereto, said trunnion means adapted to receive a stem and closure member.

2. A structure as defined in claim 1 wherein said seat element is comprised of a molded fluorocarbon.

3. The structure of claim 1 wherein said laminated stampings are of substantially uniform thickness.

4. The structure of claim 3 wherein the laminated stampings in the central portion of said body member extend circumferentially beyond the laminations on adjacent sides to enable said extensions to cooperate with mating pipe flanges in centering said body in a pipeline.

5. In a fabricated valve body: a plurality of preformed stamped laminations having a central passage for fluid, said laminations secured together in aligned relationship and being of substantially uniform thickness so that alignment of successive layers provides said body members with parallel end faces, each of said end faces having a circumferential recess in proximity to said central passage, said recesses adapted to receive a seat element which covers said central passage; diametrically opposed trunnion means positioned in said body adapted to receive a stem and closure member; and, seat means positioned in said central passage adapted to cooperate with the closure member.

6. A structure as defined in claim 5 wherein said seat element is comprised of a resilient material.

7. The structure of claim 5 wherein the laminated stampings in the central portion of the body member extend circumferentially beyond the laminations on adjacent sides to enable said extensions to cooperate with mating pipe flanges in centering said body in a pipeline.

* * * * *